Feb. 26, 1957 M. CANEPA 2,783,464

DECODING APPARATUS

Filed May 4, 1955 2 Sheets-Sheet 1

INVENTOR.
MICHELE CANEPA

BY Kenyon & Kenyon
ATTORNEYS

Feb. 26, 1957

M. CANEPA 2,783,464

DECODING APPARATUS

Filed May 4, 1955

2 Sheets-Sheet 2

INVENTOR.
MICHELE CANEPA

BY Kenyon & Kenyon

ATTORNEYS

United States Patent Office 2,783,464

Patented Feb. 26, 1957

2,783,464

DECODING APPARATUS

Michele Canepa, South Norwalk, Conn., assignor to Olivetti Corporation of America, New York, N. Y., a corporation of Massachusetts Application May 4, 1955, Serial No. 505,977

11 Claims. (Cl. 340—347)

The present invention relates to decoding apparatus for a computer system and more particularly to a decoder adapted to convert coded-decimal values into rotational analog form.

In the modern calculating machine, the information supplied as input to the machine is generally in decimal form and the output information yielded by the machine is likewise in decimal form. However, the internal operation of the machine may be of the binary type, such as the coded-decimal, so that it becomes necessary to translate or decode one system of information to another. For example, where the calculated result is to be printed in decimal terms and the calculation is carried out in binary terms, to operate the printer the binary values must first be decoded. Where the printing device takes the form of a rotary wheel carrying decimal characters, in order to adjust the angular position of the wheel to print the desired decimal value, the binary value must first be converted to its rotational analog so as to adjust the angular position of the printing wheel accordingly.

In view of the foregoing, it is the principal object of the present invention to provide an improved decoding apparatus adapted to convert digital to analog values. Also an object of the invention is to provide decoding apparatus which is capable of extremely rapid operation and is thereby especially suited for use with electronic computer systems.

More particularly, it is an object of the invention to provide a decoder apparatus including a radial scanning arm operating in conjunction with a commutator assembly and which develops an output signal at an angular position determined by the applied digital information.

A further object of the invention is to provide a commutator assembly including a plurality of concentrically arranged coding rings whose relative angular positions are controlled in accordance with applied information to provide a radial coincidence path at an angular position determined by the applied information.

It is still another object of the invention to provide a digital to analog converter of relatively simple construction which is exceptionally reliable in operation.

Briefly stated, a preferred embodiment of a decoder in accordance with the invention comprises a plurality of concentric ring members corresponding in number to the digit column of the binary number, each of said members being provided with a multiplicity of coincidence regions in a predetermined angular spaced relation. Coupled to the respective concentric members are magnetically-actuated mechanisms adapted to shift each member to one of two angular positions according to the digit in the column corresponding thereto. By virtue of the arrangement of the coincidence regions on the rings, for each binary number a radial alignment of coincidence regions will occur, the angular position of the aligned coincidence regions being different for each binary number. Finally, scanning means rotatable with respect to the concentric members are provided for detecting the angular position of the aligned coincidence regions.

The novel features of this invention together with further objects and advantages thereof will become more readily apparent when considered in connection with the accompanying drawing wherein like components in the several views are identified by like reference numerals.

Figure 1:
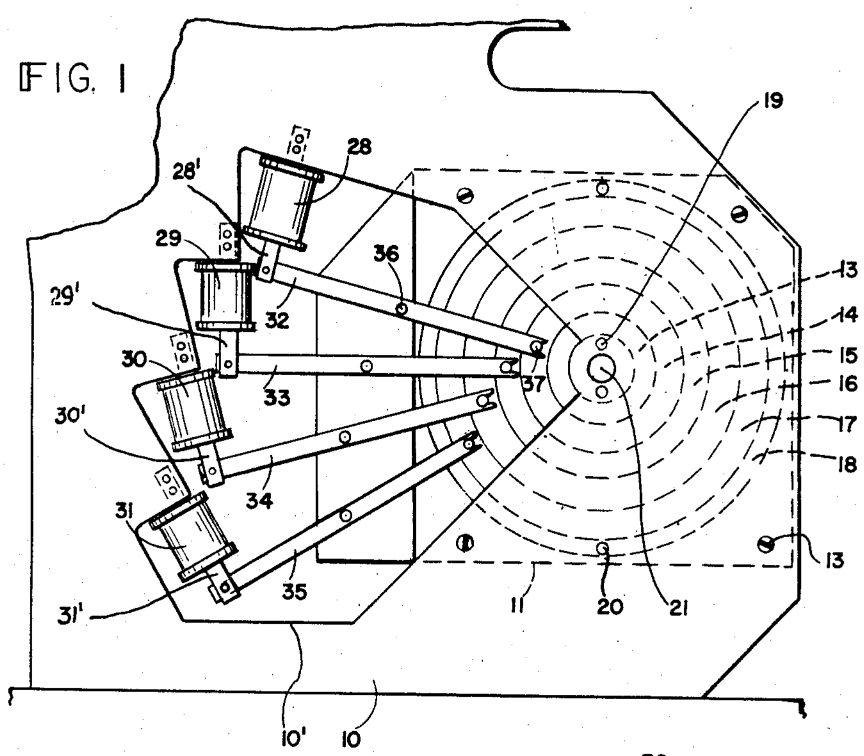
Fig. 1 is a front view of a first embodiment of a decoding apparatus in accordance with the invention.

Referring now to the drawing, and more particularly to Figs. 1 to 6, there is shown a decoder structure according to the invention comprising a front plate 10, and a back plate 11 held in spaced parallel relation thereto by four spacer rods 12, to form a supporting frame for the decoder. Positioned against the inner face of front plate 10 is a commutator assembly constituted by concentrically arranged flat annular elements 13 to 18, formed of insulating material. The innermost annular element 13 is secured to front plate 10 by screws 19, and the outermost element 18 is also secured thereto by screws 20, the remaining elements 14 to 17 being individually free to rotate relative to each other.

Coaxially disposed within the inner element 13 and extending through an opening in front plate 10 is a rotary shaft 21. Fixedly secured to the inner end of shaft 21 is a radial scanning arm 22, formed of insulating material. Mounted at spaced positions along arm 22 is a row of V shaped bridging elements 23, 24, 25, 26 and 27. Each of the bridging elements, as shown separately in Figs. 5 and 6 with respect to element 27, is constituted by a pair of spaced spring fingers **27*a* and 27*b*, which extend laterally from arm 22 and are electrically interconnected at their base portions. The fingers terminate in electrical contact points 27*a*′ and 27*b*′**, which are urged into engagement with the surface of the commutator assembly, the spacing of the upper and lower fingers being such that one finger engages the surface of one commutator ring while the other engages the surface of the adjacent ring to form a bridge therebetween.

The commutator ring elements 14, 15, 16 and 17 have printed or otherwise coated thereon sectors 14′ to 17′ of conductive material, such that the movable elements 14 to 17 constitute coding rings. The sectors on each ring are positioned in a predetermined angularly displaced relation and provide coincidence regions whose significance will be explained hereinafter. On the other hand, the stationary inner and outer commutator elements 13 and 18 are coated over their entire face with conductive material. As arm 22 rotates, the conductive sectors on the commutator rings are successively engaged by the related contact fingers of the bridging elements.

Cut into front plate 10 is an opening which is shaped to expose a segment of the commutator assembly 13 to 18. The opening 10 includes a serrated edge forming a series of recesses to accommodate electromagnetic relays 28, 29, 30 and 31, which relays are firmly attached by suitable brackets to the front plate. The electromagnets are provided with plunger-type armatures 28′ to 31′ which are pivotally linked to the respective ends of levers 32, 33, 34, and 35. The levers are each pivoted at their central point by a pivot pin, such as pin 36. The other end of the levers 32 to 35 are pivotally attached to rings 14 to 17 respectively, this being effected by means of pins 37 projecting from the rings and received within suitable slots formed in the ends of the levers.

Figures 2, 3:
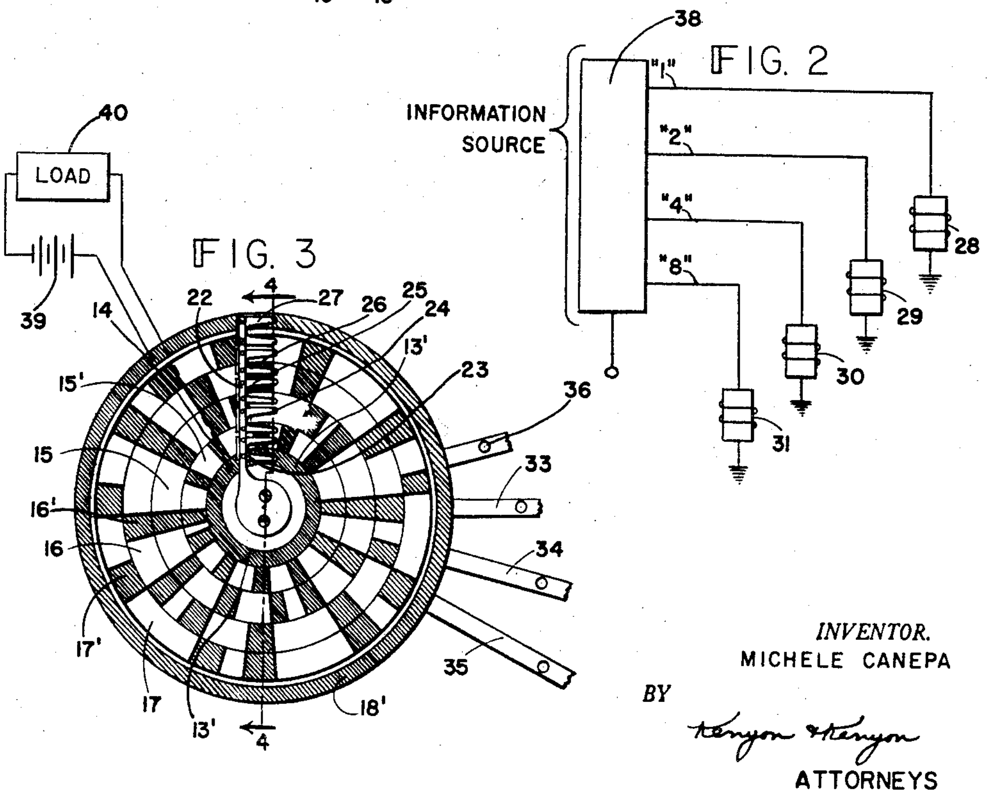
Fig. 2 is a schematic circuit diagram of the electromagnetic circuit for operating the commutator assembly.
Fig. 3 is a view of the commutator assembly and scanning arm incorporated in the decoding apparatus.

The electromagnet relays are connected, as shown separately in Fig. 2, to a source of information 38, such that in the case of a coded-decimal system, relay 28 may be considered as the "1" device, relay 29 the "2" device, relay 30 the "4" device and relay 31 the "8" device. Thus through the proper energization of the relays, any decimal number can be obtained.

When a relay is energized, the associated ring is angularly displaced by the lever action in the counterclockwise direction to occupy an "active" position, and when the relay is de-energized the ring reverts in the clockwise direction to its initial "rest" position. Hence, each ring will occupy either of two angular positions. The return movement of the ring may be effected by spring biasing the relay plunger or the associated lever.

By reason of the predetermined angular spaced relation of the conductive sectors on the rings 14 to 17, there exists for each permutation of active and rest positions a radial alignment or coincidence of individual conductive sectors, the angle of radial coincidence being different for each combination of ring positions. For example, the energization of the "2" and "8" relays 29 and 31 will cause rings 15 and 17 to assume their active positions, while the non-energization of the "1" and "4" relays 28 and 30 will cause rings 14 and 16 to assume their rest positions. This combination of ring positions in response to code-decimal information in the form of energizing pulses will produce radial coincidence at a representative angular position of the commuatator assembly and at no other position. But a different combination, such as the energization of relays 28 and 29 and the non-energization of relays 30 and 31 will produce radial coincidence at another distinct position at variance with the previous angular coincidence position of the commutator assembly. Consequently, the angular position of radial coincidence is different for each permutation of ring positions and provides a rotational analog of the coded-decimal values.

Figures 4, 5, 6, 7:
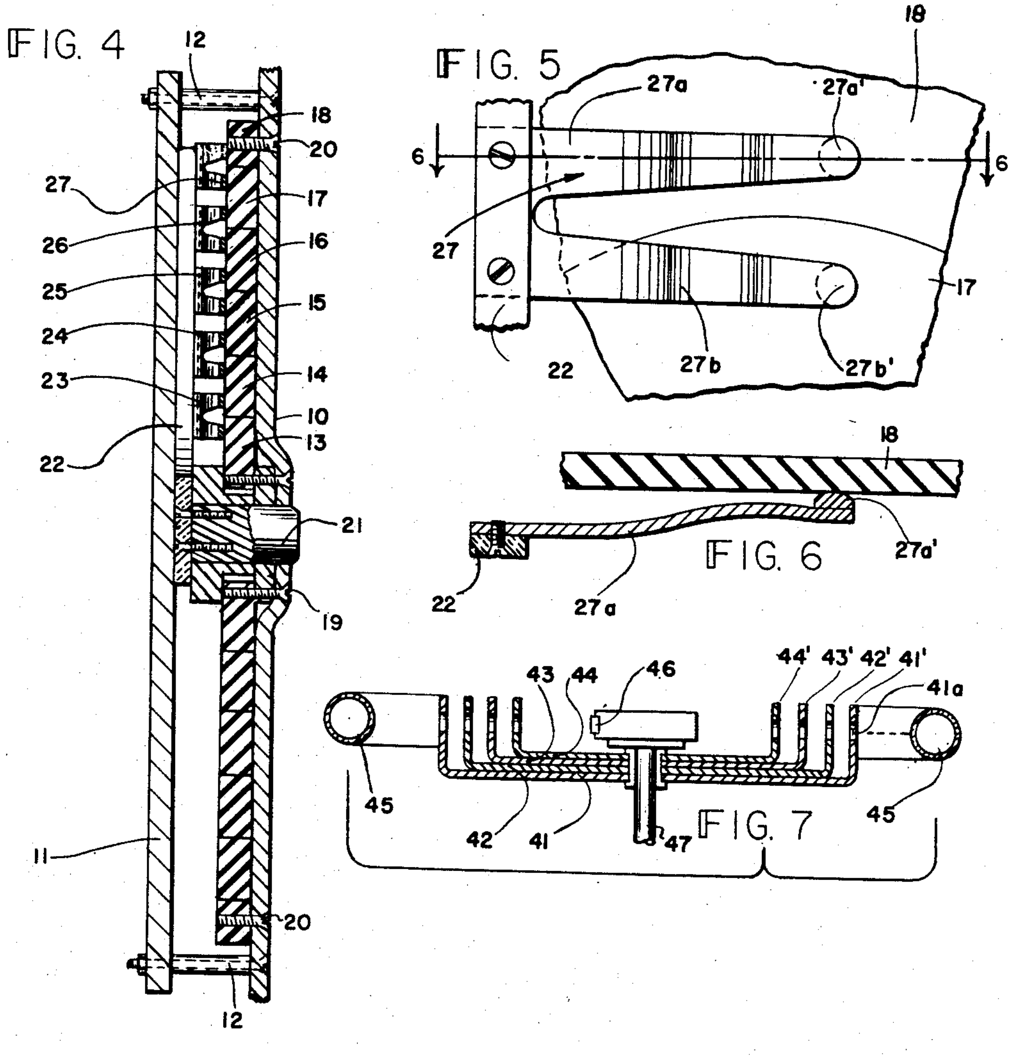
Fig. 4 is an enlarged sectional view taken along the plane of lines 4—4 in Fig. 3.
Fig. 5 is a front view in an enlarged scale of one of the contact bridge elements mounted on the scanning arm of the decoding apparatus.
Fig. 6 is a section taken along line 6—6 in Fig. 5.
Fig. 7 is a sectional view taken through a second preferred embodiment.

The detection of the radial angle of coincidence is effected by means of the scanning arm 22 whose rotation causes the spring fingers of the bridging elements 23 to 27 to ride along the face surface of the rings and thereby to engage the conductive sectors thereof. As best seen in Fig. 4, the upper finger of bridging element 27 engages the face of the outermost ring 18, as the lower finger engages the face of ring 17; the upper finger of bridging element 26 engages the face of ring 17 while the lower finger thereof engages the face of ring 16; the upper finger of bridging element 25 engages the face of ring 16 while the lower finger contacts the face of ring 15; the upper finger of bridging element 24 engages the face of ring 15, the lower finger contacting the face of ring 14. Finally, the upper finger of bridging element engages the face of ring 14, while the lower finger engages the face of the innermost ring 13.

As shown in Fig. 3, a voltage source 39 is connected through a utilization device or load 40 between the conductive face 18′ of the outer ring and the conductive face 13′ of the inner ring. Consequently, to complete the load circuit it is necessary to establish an electrical path between the inner ring and the outer ring of the commutator assembly. As pointed out previously, the upper finger of bridging element 27 engages the conductive face 18′ of the outer ring, while the lower finger of bridging element 23 engages the conductive face 13′ of the lower ring. In the event therefore the remaining upper and lower fingers of the bridging elements simultaneously engage conductive sectors on the rings 14 to 17, then the circuit will be completed. This occurs only when the conductive sectors are in radial coincidence, which coincidence arises at an angular position which is representative of the applied code information.

As the scanning arm 22 sweeps the commutator rings, it will detect the angular position of radial alignment of the conductive sectors, the position being indicated by a voltage pulse applied to load 40. The time position of the pulse relative to the zero position of the commutator assembly is of course determined by the radial angle of coincidence.

The decoder may be used in conjunction with a printing device by synchronizing the rotation of the decimal printing wheel with the scanning arm of the decoder and arresting the wheel at the angular position at which coincidence is detected by the scanning arm, the wheel then being caused to print. It will be obvious that there are numerous other ways whereby the voltage pulse indicating the detected angular position of coincidence may be utilized to operate information recording systems.

Referring now to Figs. 6 and 7, a second preferred embodiment of the decoding apparatus is illustrated comprising four disc shaped elements 41, 42, 43 and 44 having concentrically disposed peripheral flanges 41′, 42′, 43′ and 44′, respectively. Formed in the peripheral flanges are apertures, such as aperture 41*a* formed on flange 41′, which apertures are angularly displaced at positions corresponding to the conductive sectors shown in Fig. 3. The disc shaped elements 41 to 44 are shiftable between two angular positions in accordance with applied information, this movement being effected by means which may take the form of the relay and lever mechanism shown in Fig. 1.

Consequently, for each combination of positions a radial alignment of apertures in the several flanges will occur. To detect this alignment, there is provided an annular light source 45 circumferentially surrounding the disc assembly and illuminating the periphery of the outermost flange 41. In the event the individual apertures on the several flanges are in radial alignment, a beam of light from source 45 will be transmitted through the aligned apertures. To detect the angular position of radial alignment, a scanning light detector, such as photocell 46, is mounted on a rotary shaft 47 extending through the common axis of the disc assembly. The scanning light detector will respond to light impinging thereon when its angular position is coincident with the radial beam projected through the aligned apertures. In this manner, coincidence of the apertures is detected and may be relayed by suitable amplifier means to a utilization device in the output section of the calculator.

While there has been shown what are considered to be preferred embodiments of the invention, it will be manifest that many changes and modifications may be made therein without departing from the essential spirit of the invention. It is intended therefore in the accompanying claims to cover all such changes and modifications as fall within the true spirit of the invention.

What is claimed is:

1. Decoding apparatus comprising a plurality of concentric members, each of said members having angularly spaced coincidence regions, means for displacing said concentric members individually between first and second angular positions in accordance with applied information whereby the angular positions of individual regions on the several members are caused to coincide, and means rotatable with respect to said concentric members for detecting the angular coincidence of the individual regions.

2. Apparatus, as set forth in claim 1, wherein said regions are constituted by conductive areas, which areas function to complete an electrical path when the individual regions of the concentric members lie in coincident relation.

3. Apparatus, as set forth in claim 1, wherein said regions are constituted by light admitting apertures, which apertures function to provide an unobstructed light path when the individual apertures of the concentric members lie in coincident relation.

4. Decoding apparatus for digital-to-analog conversion of binary information, comprising a plurality of independently rotatable concentric members corresponding to the respective digit columns of a binary number, each of said members being provided with a plurality of coincidence regions in predetermined angularly spaced relation, means for shifting each of said members angularly in one of two positions according to the value of the digit in the column corresponding thereto, whereby selected ones of said regions are caused to align themselves radially with one another, and means rotatable with respect to said concentric members for detecting the angular position of the aligned coincidence regions to provide an analog result.

5. Decoding apparatus for digital-to-analog conversion of binary information comprising a plurality of concentrically arranged ring shaped members, each of said members being provided with electrically conductive sectors in predetermined angularly spaced relation, means for shifting said members individually between one of two angular positions according to the values of the digits in the invidual digit columns, whereby certain ones of said sectors are caused to align themselves radially with one another, and scanning means rotatable with respect to said members for detecting the angular position of the aligned conductive sectors to provide a conductive path therebetween.

6. Decoding apparatus for digital-to-analog conversion of binary information comprising a plurality of concentrically arranged ring shaped members, each of said members being provided with electrically conductive regions in predetermined angularly spaced relation, means for shifting said members individually between one of two angular positions according to the values of the digits in the individual digit columns, whereby certain ones of said regions are caused to align themselves radially with one another, and scanning means rotatable with respect to said members for detecting the angular position of the aligned conductive regions to provide a conductive path therebetween, said scanning means including bridging elements adapted to interconnect coincident regions of adjacent members.

7. Decoding apparatus for digital-to-analog conversion of binary information comprising a plurality of ring-shaped commutator members disposed about one another concentrically, each of said members being provided with electrically conductive sectors in predetermined angularly spaced relation, electromagnetically-actuated commutator-positioning mechanisms to shift the individual commutator members to one of two angular positions depending on the values of the digits appearing in the individual digit columns, whereby certain ones of said sectors are caused to align themselves radially with one another, scanning means mounted for rotation about the common axis of said commutator members and including bridging elements to make electrical contact with the individual aligned conductive sectors and effectively to provide a through electrical connection between the innermost and outermost rings.

8. Decoding apparatus for digital-to-analog conversion of binary information comprising a plurality of concentric rings, the innermost and outermost rings having a conductive surface, the remaining rings being provided with electrically conductive sectors in predetermined angularly spaced relation, means for moving said remaining rings individually between first and second angular positions according to the values of the digits in the individual digit columns whereby certain ones of said sectors are caused to align themselves radially with one another, a scanning arm mounted for rotation about the common axis of said rings, a plurality of mutually insulated bridging elements mounted on said arm, each element having a pair of electrically interconnected contact fingers engaging the respective surfaces of adjacent rings, and electrical circuit means coupled between the innermost and outermost contact elements to produce an electrical signal when said bridging elements are electrically interconnected as a result of the conductive paths formed by the conductive sectors when in radial alignment.

9. Decoding apparatus for digital-to-analog conversion of binary information comprising a plurality of generally circular members, one for each digit column, said members having peripheral flanges disposed about one another concentrically, each of said flanges being provided with apertures in predetermined angularly spaced relation, means for shifting the individual circular members to one of two angular positions depending upon the values of the digits appearing in the individual digit columns, whereby certain ones of said apertures are caused to align themselves radially with one another, and means rotatable with respect to said members for determining the angular position of the aligned apertures.

10. Apparatus according to claim 9 wherein said last named means comprises a photocell and a source of light to illuminate the photocell through the aligned apertures.

11. Apparatus according to claim 10 wherein said last named means comprises a photocell mounted for rotation about the common axis of said circular members, and an annular source of light directed toward the periphery of the outermost flange to illuminate said photocell through the aligned apertures when the angular positions of said photocell and said apertures coincide.

No references cited.